(No Model.)
F. RICHARDSON.
DIE FOR MAKING RUBBER HEELS.
No. 296,454. Patented Apr. 8, 1884.
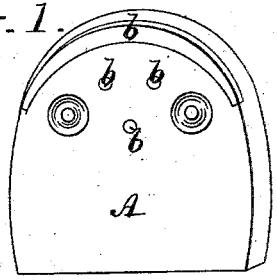
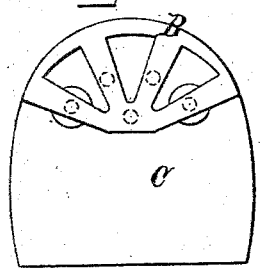 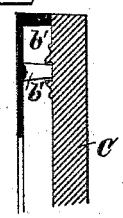 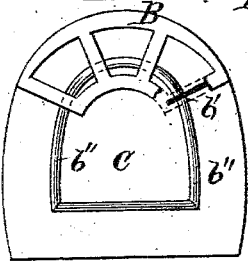 
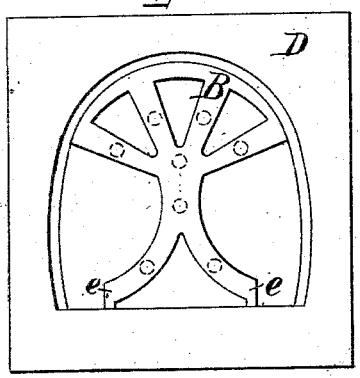 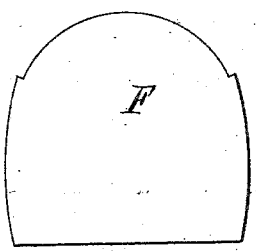 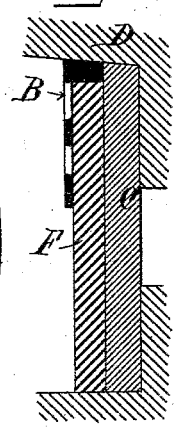
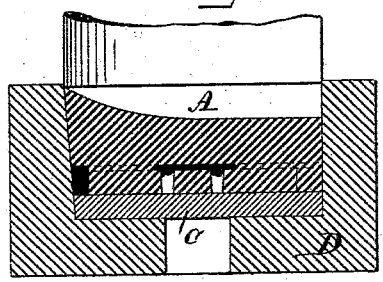
WITNESSES:
Wm. L. Cook
Henry J. Miller
INVENTOR:
Frederick Richardson
by Jos. A. Miller & Co. attys

UNITED STATES PATENT OFFICE.

FREDERICK RICHARDSON, OF PROVIDENCE, RHODE ISLAND.

DIE FOR MAKING RUBBER HEELS.

SPECIFICATION forming part of Letters Patent No. 296,454, dated April 8, 1884.

Application filed May 15, 1882. (No model.)

*To all whom it may concern:*

Be it known that I, FREDERICK RICHARDSON, of the city and county of Providence, and State of Rhode Island, have invented a new and useful Improvement in Molds and Dies for Forming Metal-Filled Rubber Heels; and I hereby declare that the following is a full, clear, and exact description of the same, reference being had to the accompanying drawings, forming part of this specification.

My invention relates to molds and dies for forming rubber heels having wearing-plates embedded in them; and the object of my invention is to so arrange the mold and its die that the wearing-plate shall be held in true normal position relative to the mass of rubber placed in the mold to form the heel.

My invention consists in the provision of a mold arranged to receive a peculiarly-constructed die-plate, and also in the peculiar and novel construction of the said die-plate, as hereinafter described and claimed.

Figure 1 is a perspective view of a rubber heel made after this improved process. Fig. 2 is a view of a metal frame resting on the plate forming the bottom of the mold. Fig. 3 is a sectional view of the metal frame and the mold-plate, showing the recess in the mold-plate by which the frame is held in place. Fig. 4 is a view of a metallic frame resting on the plate forming the bottom of the mold. Fig. 5 is a sectional view, showing the frame held to the mold-plate. Fig. 6 is a top view of a mold, showing a frame placed therein, which bearing against the sides of the mold is thereby held in place. Fig. 7 is a view of a rubber blank. Fig. 8 is a sectional view of a mold, showing the sheet of rubber under the metal frame, so as to hold the same in place in the mold. Fig. 9 is a sectional view of a mold, the rubber heel, and the frame provided with wearing-surfaces molded into the heel.

In the drawings, A is the rubber heel, molded from unvulcanized rubber in a mold to give it the proper shape.

B is the metal frame, made of any desired form, so as to allow a number of openings, through which the rubber extends and firmly holds the frame in place. The metal frame B is provided with wearing-surfaces extending to the tread of the heel. Such wearing-surfaces may form a rib or flange, $b$, protecting the rear edge of the heel; or it may extend all around the heel, and a number of ribs or points of metal, $b'$, may extend from the plate B to the tread of the heel, so as to protect the rubber and increase the durability of the heel.

C is the die-plate placed into the mold, on which the tread of the heel is formed. On this plate the number of the heel and the name of the manufacturer are usually engraved, so as to be impressed on the bottom of the heel, and therefore this plate is made separable and is inserted into the mold.

D is the mold proper.

When the soft rubber is pressed into the mold to form the heel, any metallic wearing-surface to be embedded in the rubber must be firmly held against displacement, and must also be firmly supported, so as to withstand the pressure exerted in forcing the rubber into the mold. To so hold the metal frame B in the proper position, I use different devices, and have shown some of them in the accompanying drawings.

In Figs. 2 and 3 the projecting wearing-points $b'$ enter the shallow holes made in the plate C by raising a rib above the surface of the plate.

In Figs. 4 and 5 the wearing-ribs $b'$ enter slits formed in the raised bead $b''$, so that while the ribs $b'$ rest on the plate C the frame will be firmly held in place and the rubber pressed around the same, embedding the metal frame in the molded heel.

In Fig. 6 the frame is shown to touch the sides of the mold at opposite points, the points $e\ e$ having sufficient spring to hold the frame when it is forced into the mold, the wearing-points resting on the plate C.

In Fig. 8 the sheet of rubber F is placed on the plate C. It is cut of such form that it will fit the metal frame and fill up the space between the same and the mold, so as to securely hold the same in place, when the balance of the rubber is forced into the mold to complete the heel, which, when vulcanized, will have the metal frame firmly embedded therein.

Having thus described my invention, I claim as new and desire to secure by Letters Patent—

1. The improved die-plate C, provided with the depressions to receive the projections $b'$ of the wearing-plate B, and also with the slitted raised bead $b''$, to receive the radial portion of the wearing-plate, substantially as described.

2. The combination, with the mold D, of the die-plate C, having depressions and the slitted bead, as shown and described, whereby said die-plate is adapted to receive and hold the skeleton wearing-plate having the projections $b'$, for the purposes set forth.

FREDERICK RICHARDSON.

Witnesses:
HENRY J. MILLER,
M. E. EMERSON.